United States Patent [19]
Smitzer

[11] 3,733,121
[45] May 15, 1973

[54] MICROFICHE READER
[75] Inventor: Louis A. Smitzer, San Diego, Calif.
[73] Assignee: Seaco Computer-Display Incorporated, Garland, Tex.
[22] Filed: Dec. 15, 1969
[21] Appl. No.: 885,203

[52] U.S. Cl. ..................353/27, 353/87, 353/78, 353/23
[51] Int. Cl......G03b 23/08, G03b 1/48, G03b 21/20
[58] Field of Search..................353/25, 87, 26, 27, 353/103, 122; 240/52.1, 85, 86

[56] References Cited

UNITED STATES PATENTS

| | | | |
|---|---|---|---|
| 3,352,201 | 11/1967 | Brownscombe | 353/27 |
| 3,188,910 | 6/1965 | Brownscombe | 353/25 |
| 3,413,061 | 11/1968 | Simpson | 353/27 |
| 3,442,581 | 5/1969 | Smitzer | 353/27 |
| 3,424,524 | 1/1969 | Akiyama | 353/27 |
| 3,270,196 | 8/1966 | Foley | 353/87 |
| 2,705,437 | 4/1955 | Lossman | 40/78.03 |
| 3,241,439 | 3/1966 | Kiner | 353/101 |

OTHER PUBLICATIONS

Selection Indicator for Fiche Viewer, O. Nielsen, IBM Technical Disclosures, Vol. 10, No. 12, May 1968

*Primary Examiner*—William D. Martin, Jr.
*Assistant Examiner*—A. J. Mirabito
*Attorney*—Kenneth R. Glaser and John F. Booth

[57] ABSTRACT

A reader for viewing enlarged images of selected portions of a flat film microfiche. The film is sandwiched between flat transparent plates of a holder, which is easily slidable in a carriage to bring a selected micro image into the optical projection path, positioning being facilitated by a guide in the table on which the carriage moves. To ensure precise focussing, the lens unit rides on and is supported by the upper plate of the film holder. When the holder is pulled forward the upper plate automatically rises to allow removal or replacement of the film. The illumination source and a portion of the optics are disposed within a removable drawer translatably positioned in the reader housing.

6 Claims, 6 Drawing Figures

PATENTED MAY 15 1973

INVENTOR.
LOUIS A. SMITZER
BY Carl R. Brown
ATTORNEY

INVENTOR.
LOUIS A. SMITZER
BY
Carl R. Brown
ATTORNEY

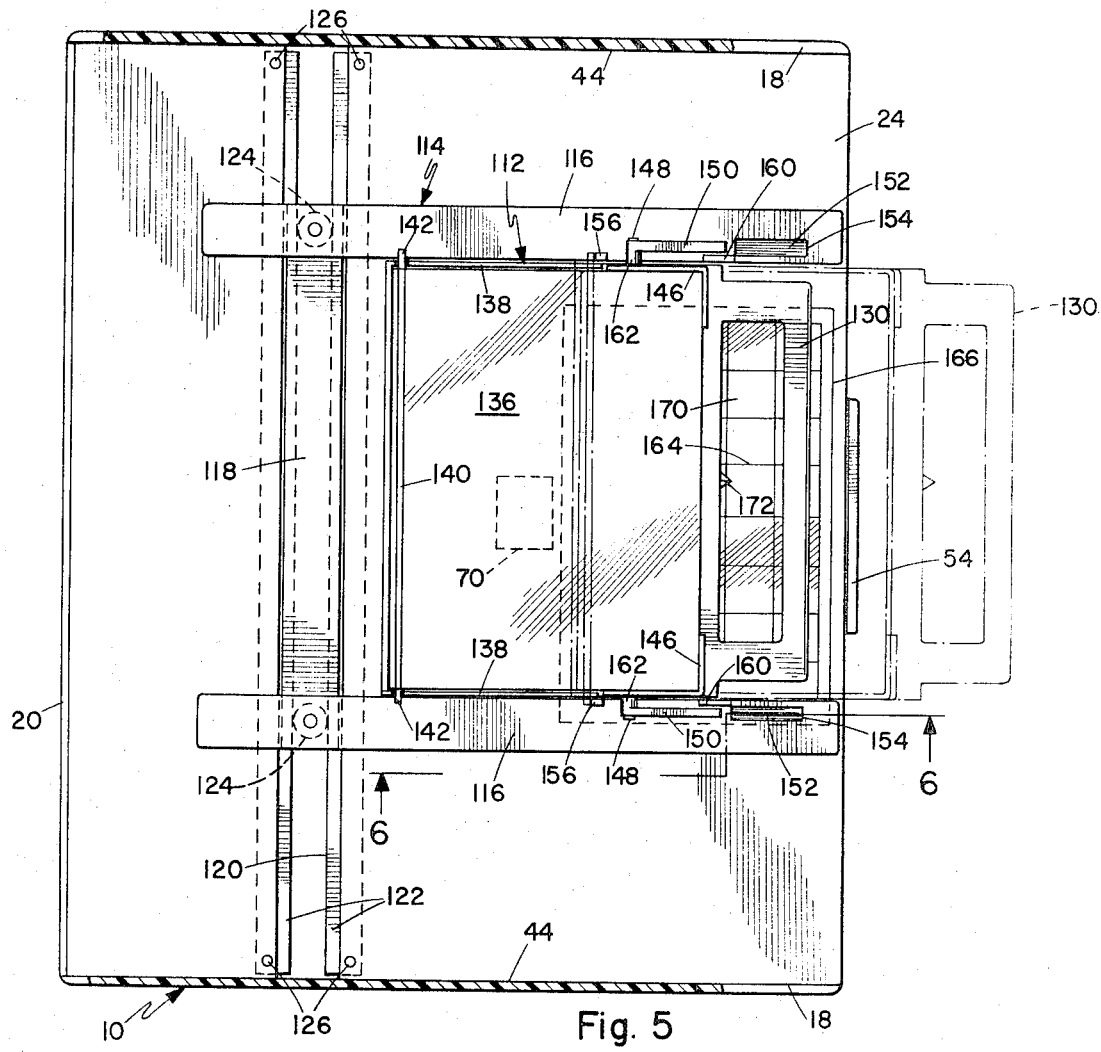
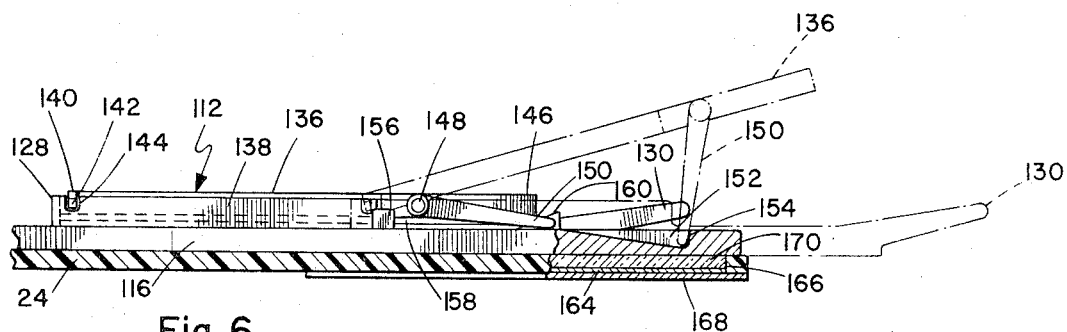

MICROFICHE READER

BACKGROUND OF THE INVENTION

Projection type readers for viewing microfiche images on a multiple image film, usually have a film holder which is positioned by external knobs or controls operating rack and pinion, or other such drive mechanism. It is often necessary to remove the holder from the unit to insert or remove a film, with catches, locks and the like to be operated. Since enlargement is great, the lens is necessarily of short focal length and focus is critical, small variations in film thickness and holder positioning making frequent adjustments necessary.

SUMMARY OF THE INVENTION

In the microfiche reader described herein, the film is held between transparent flat plates of a holder which rests on a flat table and is easily positioned in proper alignment by a smoothly moving carriage. To ensure precise focusing, the projection lens actually rides on and is supported by the upper transparent plate of the holder, so that the film plane to lens distance is constant. When the film holder is pulled forward, the upper plate is automatically lifted for access to the film, and the holder can be removed completely from the reader without disengagement of any retaining means. The holder has a pointer which is positioned on a guide recessed in the table to align a selected micro image frame for projection, the guide being readily interchangeable to match a specific film format. A removable drawer element translatably positioned in the reader housing contains the illumination source and a portion of the optical system which is aligned with the projection lens. The reader is extremely simple in structure and operation, with a minimum of movable or adjustable parts.

It is therefore an object of this invention to provide a new and improved microfiche reader.

It is another object of this invention to provide a new and improved microfiche reader having a unique optical system configuration and arrangement, and a readily accessible and operable film holder, which is maintained in constant precise focus in the optical system and that has an interchangeable film format.

Other object and many advantages of this invention will become more apparent upon a reading of the following detailed description and an examination of the drawings, wherein like reference numerals designate like parts throughout and in which:

FIG. 5 is a sectional view taken on line 5—5 of FIG. 3.

Figure 1:
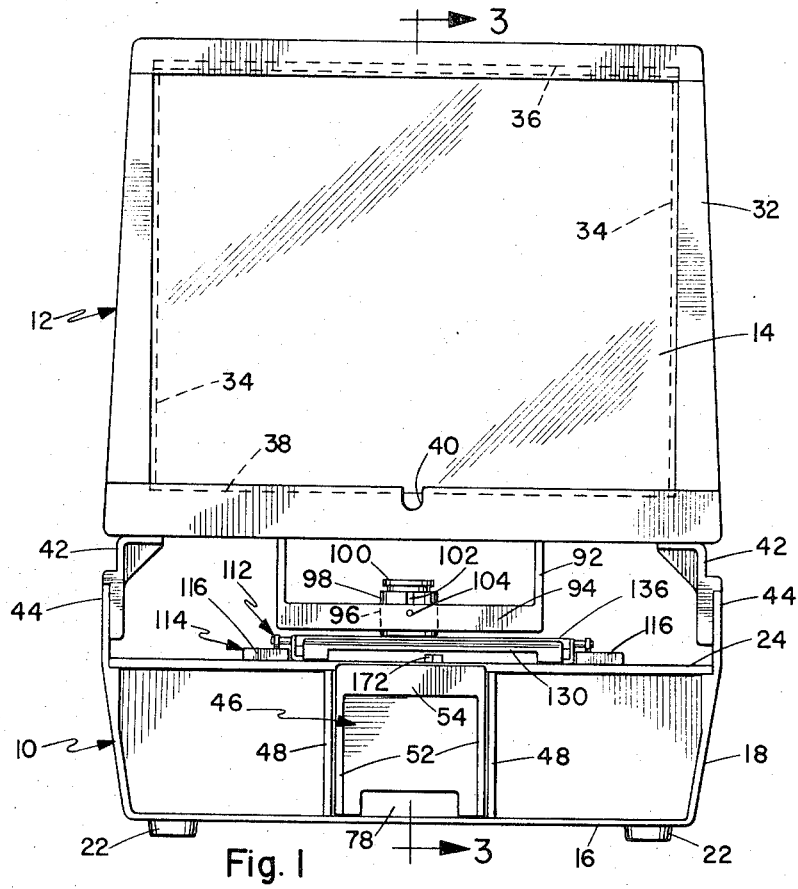
FIG. 1 is a front elevation view of the complete reader.
Figure 2:
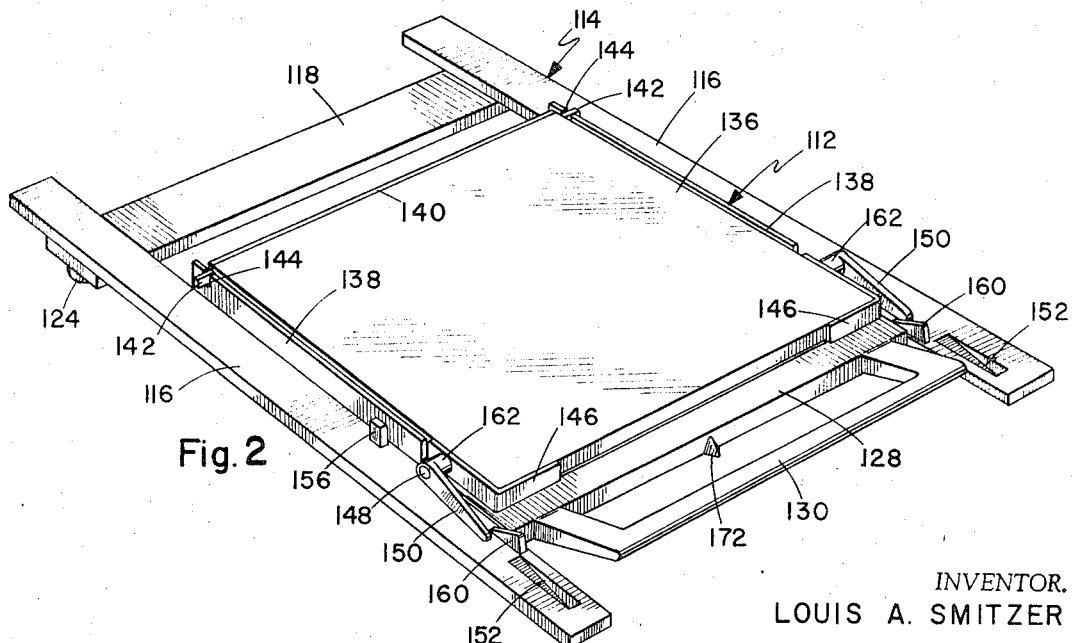
FIG. 2 is a perspective view of the film holder.

FOG. 6 is an enlarged sectional view taken on line 6—6 of FIG. 5.

DESCRIPTION OF THE PREFERRED EMBODIMENT

The reader unit comprises a base housing 10 containing the illumination system, and an upper housing 12 in which the back projection type viewing screen 14 is mounted. Base housing 10 has a bottom panel 16, side walls 18 and a rear wall 20, and rests on feet 22 secured below the bottom panel. The top of base housing 10 is closed by a flat table 24, which extends forward of the upper housing and is the full width of the base between the side walls 18.

Upper housing 12 has side walls 26, a back wall 28, top panel 30 and a front frame 32, which is inclined rearwardly from the vertical for comfortable viewing. Frame 32 has inwardly projecting side flanges 34 against which the screen 14 rests, the upper edge of the screen fitting into a channel 36 in the top of the frame and the lower edge of the screen seating in a lower channel 38. In the lower center portion of frame 32 is a notch 40 opening into lower channel 38, allowing a finger or suitable tool to be inserted to lift the screen. Upper channel 36 has sufficient depth to allow the lower edge of screen 14 to be lifted clear of lower channel 38, so that the screen can be removed for cleaning. The upper housing 12 is supported in fixed spaced relation above table 24 by brackets 42 secured on upward extensions 44 of side walls 18. The specific structure will depend on the materials and method of manufacture used, and the external configuration can vary to suit particular styling requirements.

In the central forward portion of base housing 10, below table 24, is a lamp unit 46 in the form of a drawer element which slides between intermediate walls 48 in the housing. For convenience of removal and replacement, the sides 50 of lamp unit 46 have forwardly extending portions 52 joined by a cross bar 54, which fits along the forward edge of table 24 to form a handle. At the rear of lamp unit 46 is a floor panel 56 on which is mounted a projection lamp 58 in a suitable holder or socket 60. Forward of lamp 58 is an inclined mirror 62 fixed on a bracket 64 to direct light upwardly through a condenser 66, held in a mounting 68 at the top of the lamp unit. Table 24 has an aperture 70 immediately above condenser 66, a fixed stop 72 on bottom panel 16 holding the lamp unit with the condenser accurately aligned with the aperture. In the rear portion of base housing 10 is a cooling fan 74 driven by a motor 76. Cooling air is drawn in through an opening 78 in the front of lamp unit 46 and exhausted through a vent 80 in rear wall 20. Other cooling passages may be provided if required, such as by perforating bottom panel 16.

Figure 4:
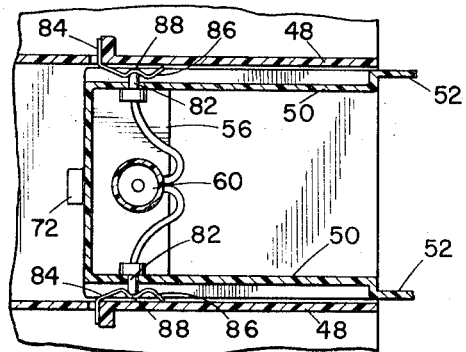
FIG. 4 is a sectional view taken on line 4—4 of FIG. 3.

For ease of maintenance, the electrical wires from lamp 58 lead to pins 82 fixed in and projecting outwardly from sides 50 on opposite sides of the lamp unit. The pins 82 engage electrical contacts 84 mounted on intermediate walls 48, which are connected to conventional power supply circuitry, not shown. Each contact 84 has a forward ramp 86 and a recessed portion 88 to receive the associated pin 82, as shown in FIG. 4, so that the lamp unit snaps into place and is readily removable.

Figure 3:
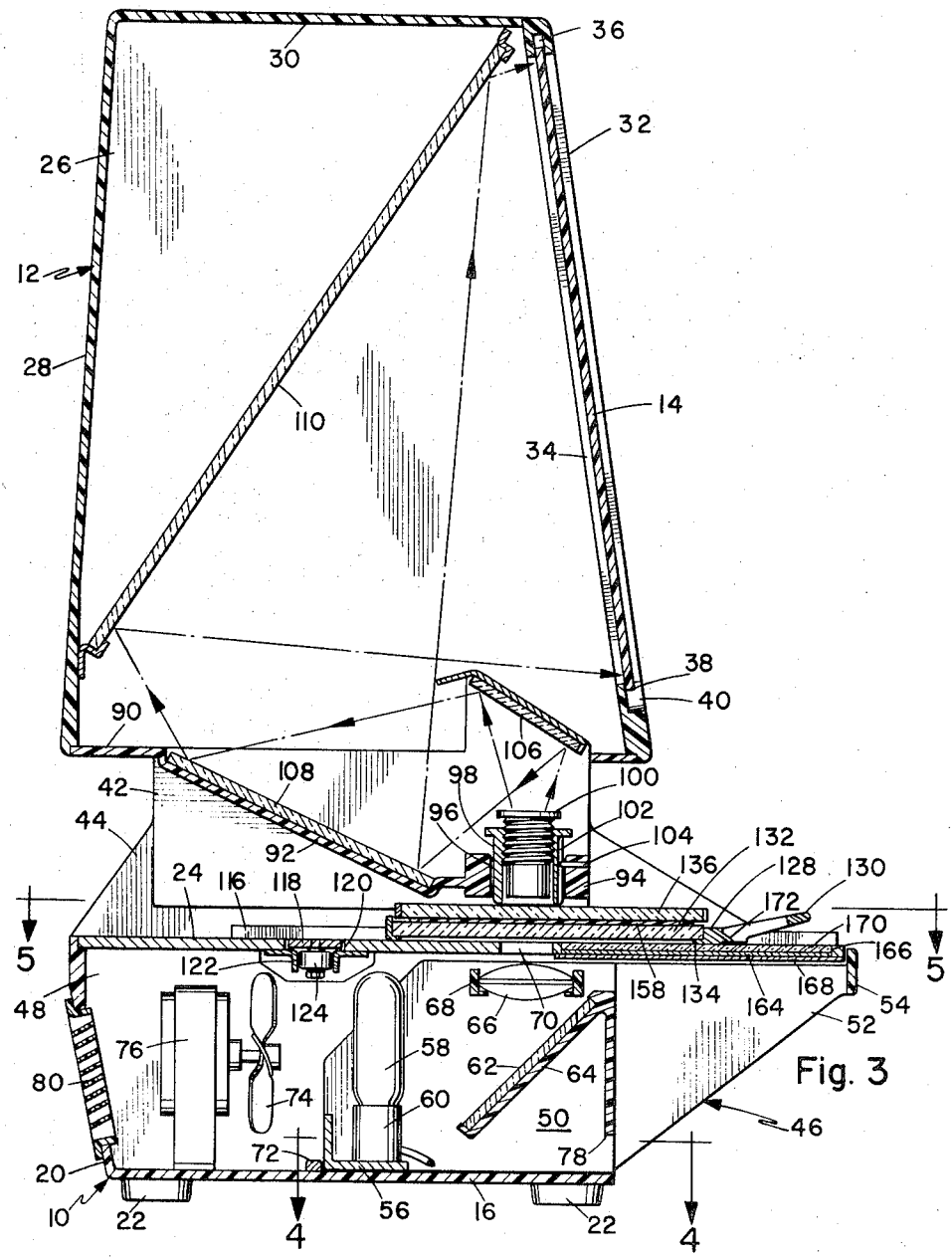
FIG. 3 is an enlarged sectional view taken on line 3—3 of FIG. 1.

Upper housing 12 has a bottom panel 90 with a downwardly extending mounting frame 92, having a transverse bar member 94 spaced above aperture 70 and parallel to table 24. In the center of bar member 94 is a cylindrical vertical bore 96, coaxial with the center of aperture 70. Mounted in the bore 96 is a vertically slidable sleeve 98 in which is a screw threaded adjustable projection lens 100, the sleeve having a longitudinal groove 102 to receive a retaining pin 104 fixed in the bar member 94 to hold the sleeve against rotation. Above lens 100 is an inclined first mirror 106 to direct an image downwardly and rearwardly to a second mirror 108, which directs the image upwardly to a final mirror 110, from which the image is projected to the rear of screen 14, as indicated by the directional arrows in FIG. 3. The optical principles are well known and the specific arrangement may vary to suit the proportions and configuration of the housing structure.

The film holder 112 slides on the top surface of table 24 and is guided by a carriage 114. The carriage comprises a pair of spaced parallel guide bars 116 connected at the rear by a cross bar 118 in a generally U-shaped frame, the cross bar sliding in a slot 120 extending transversely across the table 24 and the guide bars resting on the table. To ensure accurate tracking a pair of rails 122 are secured below table 24 forming a track below and coextensive with slot 120, and rollers 124 are mounted under each end of cross bar 118 to ride between the rails. One or both rails 122 may be made adjustable, such as by elongated the holes for the attachment screws 126 or other fastening means, so that clearance for the rollers 124 can be minimized and play in the carriage effectively eliminated.

Film holder 112 has a rectangular frame 128 which is a close sliding fit between guide bars 116, a handle 130 extending from the forward end of the frame for ease of manipulation. Within the frame 128 is a lower glass plate 132 which is supported on an internal flange 134 of the frame, just clear of table 24. An upper glass plate 136 of similar size fits on top of lower plate 132, the frame having raised sides 138 which align the upper plate. Fixed to the rear edge of upper plate 136 is a bar 140, at opposite ends of which are outwardly projecting hinge pins 142, which rest in notches 144 in the sides 138. Upper plate 136 can thus swing upwardly about the hinge pins, or be lifted from the frame to facilitate cleaning. The upper plate extends forward of raised sides 138, and fixed to the front corners of the upper plate are corner brackets 146. Each corner bracket has an outwardly projecting pin 148 on which is pivotally mounted a lifting lever 150, the levers extending forward and resting on guide bars 116. In the forward end portions of guide bars 116 are downwardly inclined ramp sockets 152, in longitudinal alignment with levers 150. When holder 112 is pulled forward, the levers slide down into the ramp sockets until they reach the stop faces 154 at the forward ends of the sockets. Continued pulling on handle 130 then causes the front end of the upper plate 136 to be raised by the pivoting action of the levers, as in the broken line position in FIG. 6. To limit the forward motion of the holder, the guide bars 116 have fixed stops 156 which engage the projecting hinge pins 142, with the levers 150 slightly beyond vertical so that the upper plate is held open. This facilitates removal or insertion of a film 158 between the plates of the holder. Initial opening of the holder is assisted by upwardly and forwardly inclined ramps 160 on guide bars 116, immediately rearwardly and inwardly of ramp sockets 152. The inboard hub portions 162 of the levers 150 ride up ramps 160, as the levers approach stop faces 154, and thus avoid any abrupt resistance to the forward pulling action.

Precise focus is maintained by allowing the sleeve 98 of the projection lens to ride on the top face of upper plate 136. Once the focus is adjusted the lens is thus held at the correct distance from the film plane as the film holder is moved. It is, of course, necessary for the upper plate to be of good quality plane parallel glass, in order to hold the focus.

The microfiche film 158 is normally composed of a plurality of individual frames of constant size arranged in rows, each frame being individually positioned under the projection lens for viewing. To aid in locating each frame as required, a guide chart 164, with divisions corresponding to the microfiche frames, is used. The forward portion of table 24 has a shallow cavity, shown as a rectangular opening 166 with a bottom closure plate 168 secured under the table. Guide chart 164 is placed in the opening and held by a transparent cover plate 170, flush with the upper surface of the table. On the forward edge of frame 128 is a pointer 172, positioned so that when the pointer is over a particular frame of the guide chart, the corresponding microfiche frame is in projection position. Selected frames can thus be quickly located and various microfiche arrangements can be accommodated by inserting the appropriate guide chart.

The smoothly sliding film holder and carriage riding on a flat table surface facilitate manual positioning without the need for mechanical drive means or special alignment mechanism. Focus is precisely held by the simple expedient of using the film holder surface as a guide for the projection lens, resulting in an accurate viewer with a minimum of parts and correspondingly low maintenance requirements.

Having described my invention, I now claim:

1. A reader for viewing selected frames of a microfiche film, comprising:

upper housing means containing a viewing screen on a forward side thereof and means for directing an image to said screen, base housing means disposed below said upper housing means, said base housing means having a light transmitting aperture disposed in a top portion thereof, projection lens means disposed below said upper housing means and in alignment with said aperture, removable drawer means translatably mounted within said base housing, said removable drawer means having a condenser lens, illumination source, and reflector means mounted thereon, said reflector means reflecting light from said illumination source upwardly through said condenser lens, stop means to limit the translation of said removable drawer within said base housing to a position whereby said condenser lens is accurately aligned with said aperture, and electrical contact means associated with said base housing for engaging electrical contact means associated with said removable drawer means which are electrically connected to said illumination source.

2. A reader for viewing selected frames of a microfiche film, comprising:

upper housing means containing a viewing screen on a forward side thereof and means for directing an image to said screen, base housing means disposed below said upper housing means, said base housing means having a light transmitting aperture displosed in a top portion thereof, projection lens means disposed below said upper housing means and in alignment with said aperture, removable drawer means translatably mounted within said base housing, said removable drawer means having condenser lens, illumination source, and reflector means mounted thereon, said condenser lens and reflector means transmitting light from said illumination source upwardly through said light transmitting aperture to said projection lens, stop means to limit the translation of said removable drawer within said base housing to a position whereby said upwardly transmitted light is accurately aligned through said aperture, and electrical contact means associated with said base housing for engaging electrical contact means associated with said removable drawer means which are electrically connected to said illumination source.

3. The reader as defined by claim 2 further including a microfiche film holder disposed intermediate said aperture and said projection lens, said film holder being mounted for to an fro and transverse movement over said top portion of said base housing.

4. The reader as defined by claim 2 wherein said film holder comprises upper and lower transparent plates between which a microfiche film can be held, said upper plate being pivotally mounted with respect to said lower plate, and means for pivotally raising said upper plate from said lower plate as said film holder is moved in a forwardly direction.

5. The reader as defined by claim 2 including carriage frame means for supporting said film holder and having spaced parallel arms, and stop means disposed on said parallel arms, said pivotally raising means comprising a pair of levers mounted to said upper transparent plate adapted to engage said stop means on said parallel arms.

6. The reader as defined by claim 2 further including a film format chart adjacent said film holder corresponding to the format of the frames of a microfiche film within said film holder, and indicator means coupled to said film holder for indicating with respect to said format chart the identification of the frame image of the microfiche film being directed to the viewing screen.

* * * * *

UNITED STATES PATENT OFFICE
CERTIFICATE OF CORRECTION

Patent No. 3,733,121　　　　　　　　　　Dated May 15, 1973

Inventor(s) Louis A. Smitzer

It is certified that error appears in the above-identified patent and that said Letters Patent are hereby corrected as shown below:

Claim 4 should be dependent upon Claim 3 rather than Claim 2

Claim 5 should be dependent upon Claim 4 rather than Claim 2

Claim 6 should be dependent upon Claim 3 rather than Claim 2

Signed and sealed this 16th day of April 1974.

(SEAL)
Attest:

EDWARD M. FLETCHER, JR.　　　　　　　C. MARSHALL DANN
Attesting Officer　　　　　　　　　　　Commissioner of Patents